(12) United States Patent
Bos et al.

(10) Patent No.: US 9,323,113 B2
(45) Date of Patent: Apr. 26, 2016

(54) TUNABLE ELECTRO-OPTIC LIQUID CRYSTAL LENSES HAVING RESISTIVE BRIDGES AND METHODS FOR FORMING THE LENSES

(71) Applicant: KENT STATE UNIVERSITY, Kent, OH (US)

(72) Inventors: Philip Bos, Hudson, OH (US); Douglas Bryant, Aurora, OH (US); Lei Shi, Kent, OH (US); Bentley Wall, Kent, OH (US)

(73) Assignee: KENT STATE UNIVERSITY, Kent, OH (US)

( * ) Notice: Subject to any disclaimer, the term of this patent is extended or adjusted under 35 U.S.C. 154(b) by 0 days.

(21) Appl. No.: 13/900,834

(22) Filed: May 23, 2013

(65) Prior Publication Data

US 2014/0132904 A1    May 15, 2014

Related U.S. Application Data

(63) Continuation of application No. 12/802,943, filed on Jun. 17, 2010.

(60) Provisional application No. 61/269,110, filed on Jun. 19, 2009.

(51) Int. Cl.
 *G02F 1/1343* (2006.01)
 *G02F 1/1345* (2006.01)
 (Continued)

(52) U.S. Cl.
 CPC ........ *G02F 1/134309* (2013.01); *G02F 1/1345* (2013.01); *G02F 1/29* (2013.01); *G02B 3/14* (2013.01); *G02F 2001/294* (2013.01)

(58) Field of Classification Search
 USPC ........................................................ 349/200
 See application file for complete search history.

(56) References Cited

U.S. PATENT DOCUMENTS

| 4,774,537 A | 9/1988 | Moody |
| 4,909,626 A | 3/1990 | Purvis et al. |

(Continued)

FOREIGN PATENT DOCUMENTS

| CN | 101133449 A | 2/2008 |
| EP | 0258996 A2 | 3/1988 |

(Continued)

OTHER PUBLICATIONS

Joshua Naaman Haddock, Liquid Crystal Based-Electro-Optic Diffractive Spectacle Lenses and Low Operating Voltage Nematic Liquid Crystals, The University of Arizona, pp. 1-131 (2005).

*Primary Examiner* — Lauren Nguyen
(74) *Attorney, Agent, or Firm* — Hudak, Shunk & Farine Co. LPA (57) ABSTRACT

Electro-optic lenses, including liquid crystals, wherein the power of the lenses can be modified by application of an electric field. In one embodiment, the liquid crystal-based lenses include ring electrodes having a resistive bridge located between adjacent electrodes, and in a preferred embodiment, input connections for several electrode rings are spaced on the lens. In a further embodiment, liquid crystal-based lenses are provided that can increase optical power through the use of phase resets, wherein in one embodiment, a lens includes ring electrodes on surfaces of the substrates on opposite sides of the liquid crystal cell such that a fixed phase term can be added to each set of electrodes that allows for phase change across each group of electrodes to be the same and also be matched with respect to a previous group.

9 Claims, 4 Drawing Sheets

(51) Int. Cl.
*G02F 1/29* (2006.01)
*G02B 3/14* (2006.01)

(56) References Cited

U.S. PATENT DOCUMENTS

| | | |
|---|---|---|
| 7,019,890 B2 | 3/2006 | Meredith et al. |
| 7,327,434 B1 | 2/2008 | Ren et al. |
| 2002/0145701 A1* | 10/2002 | Sun et al. .................. 349/200 |
| 2006/0273284 A1 | 12/2006 | Hirose |
| 2007/0146862 A1 | 6/2007 | Moore et al. |
| 2007/0268417 A1* | 11/2007 | Kato et al. .................. 349/13 |
| 2007/0279365 A1 | 12/2007 | Kageyama |
| 2008/0212007 A1 | 9/2008 | Meredith |
| 2008/0266473 A1* | 10/2008 | Osawa et al. .................. 349/33 |
| 2009/0279050 A1 | 11/2009 | McGinn et al. |
| 2010/0105105 A1 | 4/2010 | Azucena et al. |

FOREIGN PATENT DOCUMENTS

| | | |
|---|---|---|
| EP | 1511023 A2 | 3/2005 |
| JP | 2004334031 | 11/2004 |
| JP | 2005071424 A2 | 3/2005 |
| JP | 2006092968 | 4/2006 |
| JP | 2007322710 | 12/2007 |
| JP | 2008076926 | 4/2008 |
| WO | 2008027890 A2 | 3/2008 |

* cited by examiner

TUNABLE ELECTRO-OPTIC LIQUID CRYSTAL LENSES HAVING RESISTIVE BRIDGES AND METHODS FOR FORMING THE LENSES

CROSS REFERENCE

This application is continuation application of pending U.S. patent application Ser. No. 12/802,943, filed Jun. 17, 2010 for TUNABLE ELECTRO-OPTIC LIQUID CRYSTAL LENSES AND METHODS FOR FORMING THE LENSES, which claims the benefit of priority under 35 U.S.C. §119 of U.S. Provisional Application Ser. No. 61/269,110, filed on Jun. 19, 2009, herein fully incorporated by reference.

STATEMENT OF GOVERNMENT INTEREST

The U.S. Government has a paid-up license in the inventions and the right, in limited circumstances, to require the patent owner to license others on reasonable terms as provided for by terms of contract number FA 7014-07-C-0013 awarded by the U.S. Air Force.

FIELD OF THE INVENTION

The present invention relates to electro-optic lenses, including liquid crystals, wherein the power of the lenses can be modified by application of an electric field. In one embodiment, the liquid crystal-based lenses include ring electrodes having a resistive bridge located between adjacent electrodes, and in a preferred embodiment, input connections for several electrode rings are spaced on the lens. In a further embodiment, liquid crystal-based lenses are provided that can increase optical power through the use of phase resets, wherein in one embodiment, a lens includes ring electrodes on surfaces of the substrates on opposite sides of the liquid crystal cell such that a fixed phase term can be added to each set of electrodes that allows for phase change across each group of electrodes to be the same and also be matched with respect to a previous group.

BACKGROUND OF THE INVENTION

Electro-optical lenses that utilize birefringent liquid crystal to alter their optical power are known. They have the inherent advantage over conventional glass or plastic optical lenses of being able to alter their optical power by the judicious application of an electric field. One drawback of existing liquid crystal electro-optic lenses is that the number of optical powers a single lens can generate is presently limited.

One basic structure of electro-optic liquid crystal lenses is that of a thin layer of liquid crystal sandwiched between two transparent substrates. Onto the inner surfaces of each substrate, a transparent metallic electrode structure is formed. An alignment layer is formed on top of the electrode layers to establish a specific orientation of the liquid crystal molecules when there is no electric field present. An electric field is established across the liquid crystal layer when voltage is applied to one electrode layer and an electric potential is created between the electrodes. If the electrode structure is patterned, a gradient in the field is created that gives rise to a gradient in the index of refraction of the liquid crystal layer. With proper design of the electrode structure and the applied voltages, an electro-optic lens can be fabricated.

Electro-optic liquid crystal lenses have been designed and fabricated that utilize electrode structures to generate several optical powers with a single lens.

The basic structure of a spherical electro-optic liquid crystal lens is that of a circular ring electrode design, where the transparent electrodes on one or both substrates consist of toric rings, electrically insulated from adjacent neighboring rings. Previous designs of these lenses are restrictive in the sense that the ring electrode widths and spacing often determine the optical power of the lens. However, if a very large number of very narrow electrodes could be fabricated and addressed individually, theoretically, a very large number of optical powers could be generated by such a lens.

Considering that the optical phase change between each adjacent electrode should be less than about ⅛ of a wave and that the total phase change across a lens might be as high as 100 waves, it first appears that an electrode structure consisting of hundreds of rings addressed by hundreds of input connections to the device might be required for continuous tuning. This is not an acceptable solution, however, since the photolithography needed to create such an electrode structure would be daunting. Moreover, fabricating the buss structure to connect and electrically address each electrode would be an overwhelming task and make the resulting device extremely complex and unwieldy.

The use of phase-wrapping can help mitigate the problem of fabricating hundreds of input connections to the lens. It has been previously shown in "Liquid Crystal Based Electro-Optic Diffractive Spectacle Lenses and Low Operating Voltage Nematic Liquid Crystals" by Joshua Naaman Haddock, a Dissertation submitted to the Faculty of the College of Optical Sciences in partial fulfillment of the Requirements for a Degree of Doctor of Philosophy in the Graduate College of the University of Arizona in 2005, that electrodes can be grouped in such a way that the phase change over one group is approximately one wave. Thus, the number of input connections is limited to the number of rings in each group. However, this scheme only provides high efficiency if the phase change across each group of electrodes is very close to a multiple of one wave. Thus, the phase change across each electrode group cannot be changed in a continuous manner, and as a result, the lens cannot be continuously tuned to multiple powers.

U.S. Publication No 2008/0212007 relates to an electro-optic device comprising a liquid crystal layer between a pair of opposing transparent substrates; a resistive patterned electrode set positioned between the liquid crystal layer and the inward-facing surface of the first transparent substrate; and a conductive layer between the liquid crystal layer and the inward-facing surface of the second transparent substrate, wherein the conductive layer and resistive patterned electrode set are electrically connected, and wherein said resistive patterned electrode set comprises one or more electrically-separated electrodes, wherein the desired voltage drop is applied across each electrode to provide the desired phase retardation profile.

SUMMARY OF THE INVENTION

It is an object of the invention to provide a tunable liquid crystal-based lens, wherein the number of input connections for its ring electrodes are reduced, Yet another object of the present invention is to provide a tunable liquid-crystal-based lens that is free of resets or phase wrapping.

Another object of the invention is to provide a lens having ring electrodes, wherein input connections are spaced, preferably evenly, on the lens, such as at intervals greater than every 5 and preferably about every 10 electrode rings.

A further object of the invention is to provide a lens comprising ring electrodes, wherein at least two, and preferably all adjacent electrodes are connected by a resistor.

Yet another object of the invention is to provide a lens with a transparent resistive bridge between electrode rings, wherein the resistive bridge is formed from a conductive coating, preferably indium tin oxide in one embodiment.

Still a further object of the invention is to provide a lens wherein the ring electrodes and resistive bridges are formed utilizing the same material.

Still another object of the invention is to provide a lens formed by a process comprising the step of forming a resistive bridge between two electrode rings utilizing photolithography to pattern the rings as well as the resistive bridge.

Yet another object of the present invention is to provide a tunable liquid-crystal-based lens that includes resets and utilizes phase wrapping.

A further object of the present invention is to provide a lens having substrates located on opposite sides of a liquid crystal layer, wherein both substrates include patterned electrodes.

Another object of the invention is to provide a tunable lens including two transparent substrates with patterned electrode layers located on each substrate, wherein an electro-active liquid crystal material is located between the substrates wherein one of the patterned electrode layers provides fine control over the optical phase retardance and the other layer provides coarse control of the phase over a group of at least two of the fine control electrodes.

Still a further object of the present invention is to provide a tunable lens wherein an electrode of one substrate layer overlaps at least two electrodes of an electrode layer of a second substrate, wherein said overlap is in a direction of the planes of the substrates.

Another object of the present invention is to provide patterned electrodes on two substrate surfaces whereby a fixed piston phase term is added to each set of electrodes in one section by a blazed electrode structure that allows for phase change across each group of electrodes to be the same, and also to be phase matched with respect to a previous group.

In one aspect of the invention, a tunable electro-optic lens device is disclosed, comprising at least two substantially transparent substrates, a substantially transparent conductive electrode layer operatively connected to each substrate, wherein at least one of the electrode layers is patterned and includes a plurality of ring electrodes, wherein at least one ring electrode is electrically connected to an adjacent ring electrode by a resistive bridge, and wherein an electro-active liquid crystal material layer is present between the at least two substantially transparent substrates.

Another aspect of the invention is a process for preparing a tunable electro-optic lens device, comprising the steps of providing a substantially transparent substrate forming at least two conductive electrode rings on the substrate; and a resistive bridge located between and electrically connecting said electrode rings.

Still another aspect of the invention is a tunable electro-optic lens device, comprising a first substantially transparent substrate having a substantially transparent conductive electrode layer operatively connected thereto, said electrode layer being patterned and having a plurality of ring electrodes; a second substantially transparent substrate having a substantially transparent conductive electrode layer operatively connected thereto, said second electrode layer being patterned and having a plurality of ring electrodes; and an electro-active liquid crystal material layer present between the first and second substantially transparent substrates, wherein at least one ring electrode on the second substrate covers in a planar direction at least two ring electrodes of the first substrate.

Yet another aspect of the invention is a tunable electro-optic lens device, comprising at least two substantially transparent substrates, substantially transparent conductive electrode layer on each substrate, and an electro-active material disposed between the substrates wherein the electrode layers on each substrate are patterned and comprise a plurality of ring electrodes, and wherein the patterned electrode of one layer provide fine control over the optical phase retardants and the electrodes of the other layer provide a coarse control of the phase over the group of at least two of the fine control electrodes.

BRIEF DESCRIPTION OF THE DRAWINGS

The invention will be better understood and other features and advantages will become apparent by reading the detailed description of the invention, taken together with the drawings, wherein.

DETAILED DESCRIPTION OF THE INVENTION

The electro-optic devices of the present invention are lenses that are electrically tunable and comprise a liquid crystal layer located between transparent substrates, wherein the liquid crystal material is realignable in the presence of an electric field. When voltage is applied across the cell containing the liquid crystal material, the axis of orientation of the liquid crystal material is changed, wherein the use of a patterned electrode structure creates a gradient in the field that produces a gradient in the index of refraction of the liquid crystal layer. The focal length of the lens is tuned by adjusting the applied electric field.

Tunable Lens without Phase Wrapping

Figure 4:
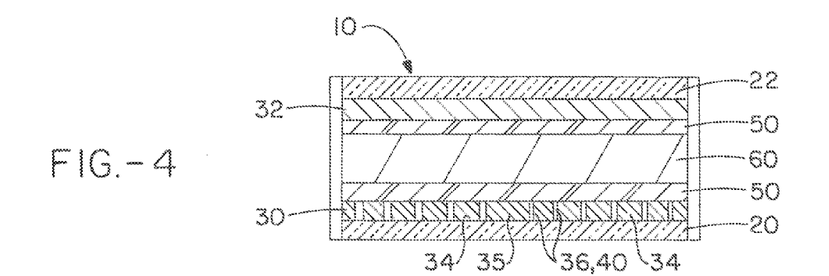
FIG. 4 is a cross-sectional view of one embodiment of a liquid crystal-based tunable lens of the present invention.

Referring now to the drawings, FIG. 4 illustrates a cross-sectional view of a portion of one embodiment of an electro-optical device 10 of the present invention. Device 10 includes a pair of substrates 20, 22, preferably planar and disposed parallel to each other in one embodiment. The substrates are maintained at a desired distance by spacers, not shown. The spacing range can vary, and in one embodiment is from about 5 to about 100 microns. An electrode layer 30 is present on lower substrate 20 and an electrode layer 32 is present on upper substrate 22, with the lower electrode layer 30 illustrated as a patterned electrode, as further explained herein. An alignment layer 50 is present on the substrates 20, 22, preferably on the electrode layers 30, 32. A liquid crystal layer 60 is present between the substrates 20, 22 and in contact with alignment layers 50. As utilized herein, the term "layer" does not require a uniform thickness and imperfections or uneven thicknesses can be present so long as the layer performs its intended purpose.

As the device 10 is a lens, the substrates 20, 22 must provide desired optical transmission and preferably are transparent. The substrates 20, 22 can be planar or can be curved. Various materials can be utilized as known in the art, such as glass, quartz or a polymer, with glass being preferred. The substrate is preferably a non-birefringent material, or aligned or compensated to minimize the effect of their birefringence.

The conductive electrode layers 30, 32 can be deposited on a substrate by any known method. Preferably, patterned electrode 30 is formed utilizing a photo-lithographic process. The electrode layer material can be any inorganic, substantially transparent conductive material. Examples of suitable materials include metal oxides such as indium oxide, tin oxide and indium tin oxide, and preferably is indium tin oxide. The thickness of the conductive electrode layer is generally from about 100 to about 2,000 angstroms. The electrode layer must be sufficiently thick to provide desired conductivity. Resistivity of the conductive electrode layer is generally from about 10 to about 1,000 ohms/sq and is preferably from about 10 to about 200 or 300 ohms/sq.

The alignment layer 50 is used to induce a particular directional orientation in the liquid crystal when no voltage is applied to the device 10. Various materials suitable for use as alignment layers are known in the art, including, but not limited to, polyimide and polyvinyl alcohol. The thickness of the alignment layer 50 should be sufficient to impart the desired directional orientation to the liquid crystal material, such as about 100 to about 1,000 angstroms. As known in the art, the alignment layer 50 is treated by rubbing in some embodiments to impart a substantially homogenous molecular orientation to the liquid crystal material prior to an electrical field being applied to the material, Generally any liquid crystal material that has an orientational order that can be controlled in the presence of an electric field can be utilized, including any nematic, smectic or cholesteric phase forming liquid crystals, or polymer-containing liquid crystals such as polymer liquid crystals, polymer dispersed liquid crystals or polymer stabilized liquid crystals. Nematic liquid crystals are preferred in one embodiment. Desirable characteristics possessed by suitable liquid crystal materials include the ability to align the liquid crystal without much difficulty, rapid switching time, and a low voltage threshold.

Figure 1:
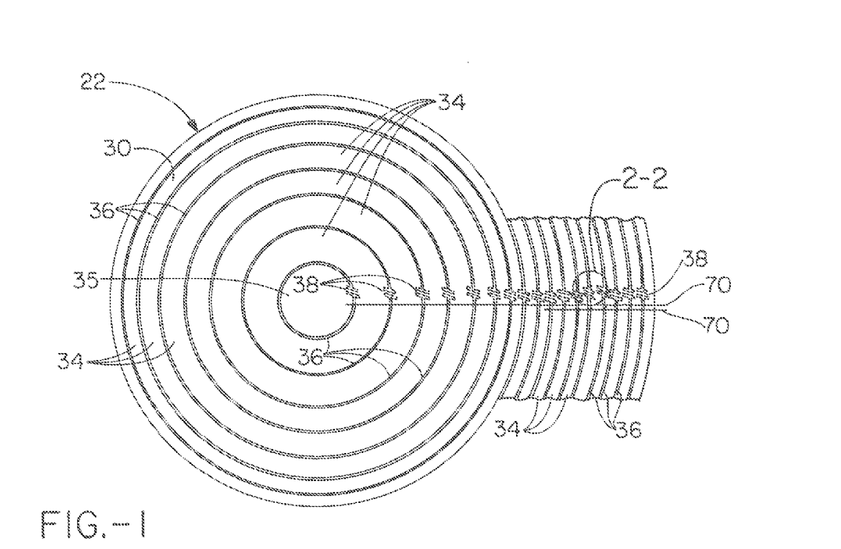
FIG. 1 is a top view of a substrate utilized to form a liquid crystal-based optical lens containing ring electrodes, wherein adjacent electrodes are connected by resistive bridges.

FIG. 1 illustrates one embodiment of a substrate 22 having an electrode layer 30 present thereon. The electrode layer 30 is patterned and includes a plurality of electrodes such as in the shape of rings 34 surrounding a ring in the form of a central disk 35, wherein adjacent rings, and the innermost ring 34 and the disk 35 are electrically separated from each other by an electrically insulating gap 36, with exception to a resistive bridge 38 as described further herein. The insulating gap 36 is an open space located between adjacent electrodes or can be a non-conducting insulating material such as silicon dioxide. In one preferred embodiment, the gap 36 is said open space. The rings 34 are preferably substantially annular and concentric, although they may not all be formed as a perfect geometric shape due to the material and processing techniques utilized. That said, the term "ring" as utilized herein encompasses structures that are ring-like, e.g. elliptical rings. Likewise, disk 35 is preferably substantially circular, but can also be ring-like. The electrodes can be in the same plane or in different planes separated by an insulator, whereby the resistive bridge 38 would connect electrodes in different planes.

The width of the rings is set so that the maximum phase difference between adjacent electrodes is less than approximately ⅛ wave in one embodiment.

The number of electrodes present on the substrate, i.e., both rings 34 and central disk 35, can vary. In one embodiment, generally from about 20 to about 2,000 and preferably from about 50 to about 200 total electrodes are present on a substrate.

Figure 2:
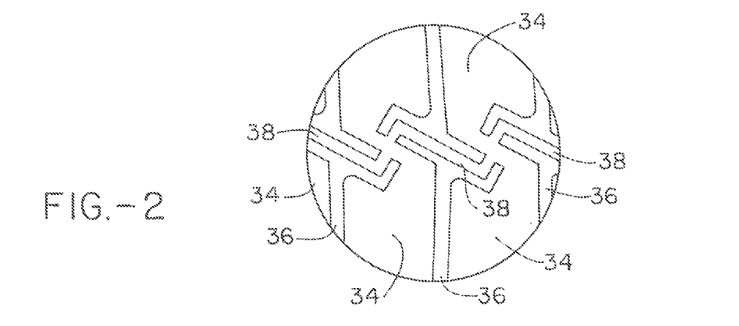
FIG. 2 illustrates a close-up top view of a portion of the patterned substrate illustrated in FIG. 1 including area 2-2, particularly illustrating a resistive bridge.
Figure 5:
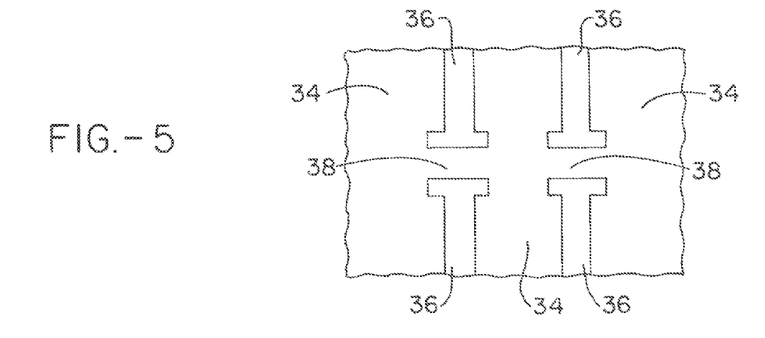
FIG. 5 is a top view of a further embodiment of an alternate structure for a resistive bridge located between ring electrodes.

According to the present invention, at least one group of electrodes, i.e., two or more electrodes, and preferably all or substantially all of the electrodes present are part of a resistive divider network. The electrode structure is designed so that a series of substantially linear changes in phase retardation between adjacent electrodes can be established that will yield the parabolic $r^2$ phase profile required to generate a focusing optic. The resistive divider network comprises a resistive bridge 38 having a desired resistance that connects adjacent electrode rings 34 or a ring 34 and disk 35, such as shown in FIGS. 1, 2 and 5. Depending on the design of the device, the resistive divider or bridge 38 can have a resistance generally from about 100 to about 2,000 ohms and preferably from about 800 to about 1,200 ohms. Resistive bridge 38 comprises a resistance path comprising an electrically conductive material, preferably bordered by a non-conductive material or an area free from conductive material that aids in creating the desired resistance between each adjacent electrode 34, 35.

The conductive material of the electrode bridge can be any material as defined for the conductive electrode layer 30. The material of the conductive electrode layer 30 can be different from the conductive material of the resistive bridge, but preferably is the same material. In one embodiment, indium tin oxide is the preferred conductive material of the resistive bridge. As an important benefit of the present invention, the method utilized to create the desired electrode layer 30, for example photolithography, is utilized to create the pattern of each resistive bridge 38. Thus, patterned electrode layer and resistive bridges are created utilizing photolithography in a single process step. Thus, no additional materials or process steps are required to form the resistive network.

In addition, if it is the case that the liquid crystal phase change with voltage is also linear, than a continuously tunable lens can be fabricated with only two input connections, one at the innermost ring, i.e., disk 35, and one connection at an outermost electrode ring, thereby eliminating the need for multiple buss lines. This embodiment is especially useful when only a small portion of the available phase change of the liquid crystal device is utilized.

In an embodiment wherein the voltage vs. phase relation of the liquid crystal device is considered linear over a small portion of the total possible parabolic phase change, it is preferable to connect each electrode by a fixed resistive bridge and then provide an input connection for several electrode rings evenly spaced on the lens. In one embodiment, an input connection is connected every $n^{th}$ electrode ring, wherein n is 2 or more. Therefore, in one embodiment, it is desirable to provide an input connection connected at the innermost ring or disk 35 and provide further input connections based on the number of rings, for example, from about 10 to about 100 electrode rings and preferably from about 10 to about 20 electrode rings. For example, in an embodiment where the substrate 22 includes 100 ring electrodes, wherein one of the ring electrodes is an innermost disk electrode, electrodes 1, 10, 20, 30, 40, 50, 60, 70, 80, 90 and 100 are provided with input connections. Thus, in this embodiment, it is only required that the phase vs. voltage relation for the liquid crystal material is linear over $\frac{1}{10}$ of the range of the previous approach wherein no resistive bridges were utilized. Similarly, in an embodiment wherein 20 input connections are employed, linearity is only required over $\frac{1}{20}$ of the full range, or every fifth electrode. FIG. 1 illustrates an input connection 70 each connected to the first electrode and the tenth electrode of electrode layer 30.

Figure 3:
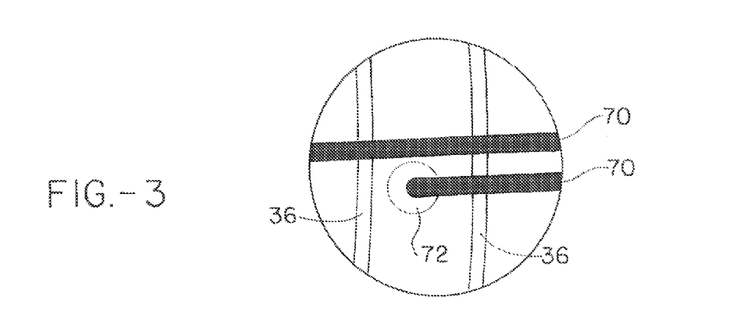
FIG. 3 is a top view of one embodiment of a buss line connected to a ring electrode through a via in the insulator.

The input connections 70 to the desired electrodes can be placed on the side of the electrode closest to the substrate or the opposite side of the electrode, away from the substrate. The input connections are preferably formed by depositing an insulating material, such as silicon dioxide between the electrode layer and the input connection. Each input connection is connected to the appropriate electrode through a via in the insulator, such as shown in FIG. 3. In an embodiment wherein an input connection is located on the side of an electrode away from the substrate, the input connection can be fabricated by depositing a thin layer of insulator over the electrode layer, and then growing an input connection line over the insulating layer for each input connection.

In an example embodiment, a liquid crystal layer, for example comprising liquid crystal 18349 available from Merck, having a thickness of about 25 µm will give an optical power of about 0.5 diopters for a lens diameter of approximately 1 cm. More optical power can be achieved by increasing the liquid crystal layer thickness, but eventually non-linearity in the fields will degrade the optical performance; the switching relaxation time between the various powers will also increase with liquid crystal thickness. Additional optical power can also be achieved by stacking multiple electro-optic devices 10.

An appropriate voltage is applied to the device 10, namely the electrode layer 30 through the input connections 70 as known to those of ordinary skill in the art. The unpatterned electrode layer 32 serves as a ground. The voltage is applied to the device 10 based on a number of factors, including, but not limited to, the liquid crystal material utilized and the thickness of the liquid crystal material between electrodes. Various methods are known in the art for controlling the voltage applied to the electrode, for example, a circuit, a processor or micro-processor.

Tunable Lens with Phase Wrapping

A further embodiment of the present invention relates to a tunable electro-optic device that utilizes phase wrapping. The device has the advantage of achieving higher optical power through the use of phase resets.

In contrast to the phase wrapping method described in the Background, the embodiment of the present invention does not require each electrode ring to have an individual output connection, but at the same time allows for a phase-wrapped lens that is tunable.

In this embodiment, patterned electrodes are provided on both substrate surfaces, on either side of the liquid crystal material, and thus a fixed "piston" phase term can be added to each set of electrodes in one section of the blazed electrode structure. This allows for the phase change across each group of electrodes to be the same, and then also to be phase matched with respect to the previous group.

Figure 10:
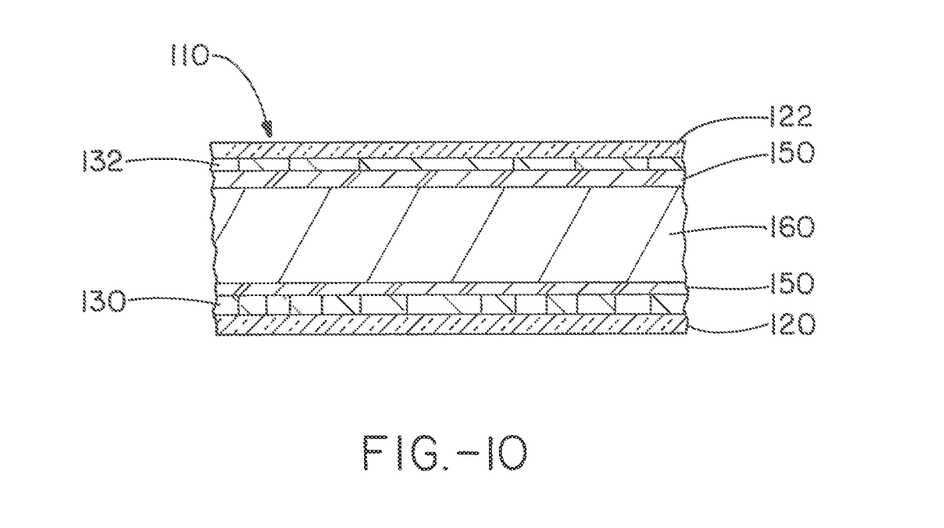
FIG. 10 is a cross-sectional view of a further embodiment of a liquid crystal-baud tunable lens of the present invention.

FIG. 10 illustrates a cross-sectional view of one portion of one embodiment of an electro-optical device 110 of the present invention. Device 110 includes a pair of substrates 120, 122 generally both parallel to each other. That said, the substrates may be planar and/or curved, etc. An electrode layer 130 is present on lower substrate 120 and an electrode layer 132 is present on upper substrate 122, with both electrode layers being patterned electrodes, as further explained herein. An alignment layer 150 is present on each substrate 120, 122, preferably on the electrode layers 130, 132 and disposed adjacent liquid crystal layer 160, wherein the materials, specifications and configurations, etc. described hereinabove for each of the respective components are herein incorporated by reference.

Figure 6:
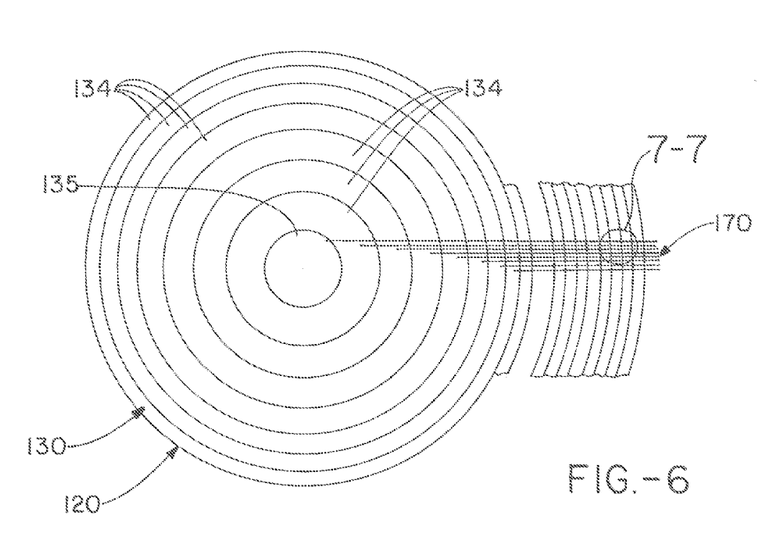
FIG. 6 is a top view of one embodiment of a substrate including an electrode layer comprising ring electrodes thereon.
Figure 7:
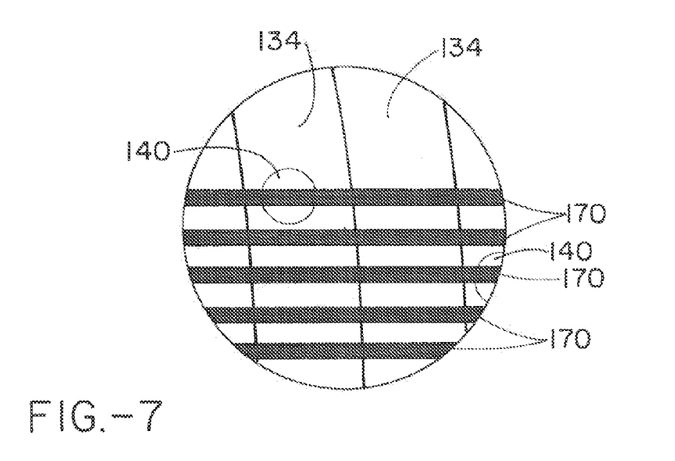
FIG. 7 is a top view of one embodiment of a buss line connected to a ring electrode through a via in the insulator.
Figure 9:
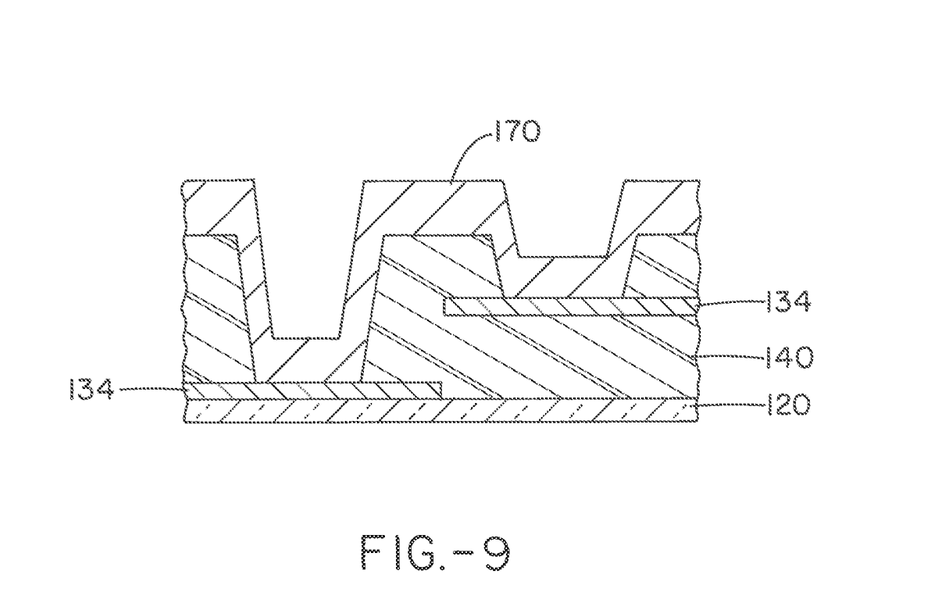
FIG. 9 is a cross-sectional view of a two-layered design for input line connections for a portion of a device of the present invention.

FIG. 6 illustrates a top view of one embodiment of substrate 120 including a plurality of electrodes, each having a respective input connection 170. Electrodes generally comprise a ring-like circular or disk electrode 135 and a plurality of ring electrodes 134, such as described herein. In a preferred embodiment, the electrode layer 130 comprises adjacent electrodes disposed in different planes, see FIG. 9 for example. Insulating material 140 separates the different planes of the ring electrodes 134. The input connection/electrode ring connection is formed through a via, such as shown in FIG. 7.

Figure 8:
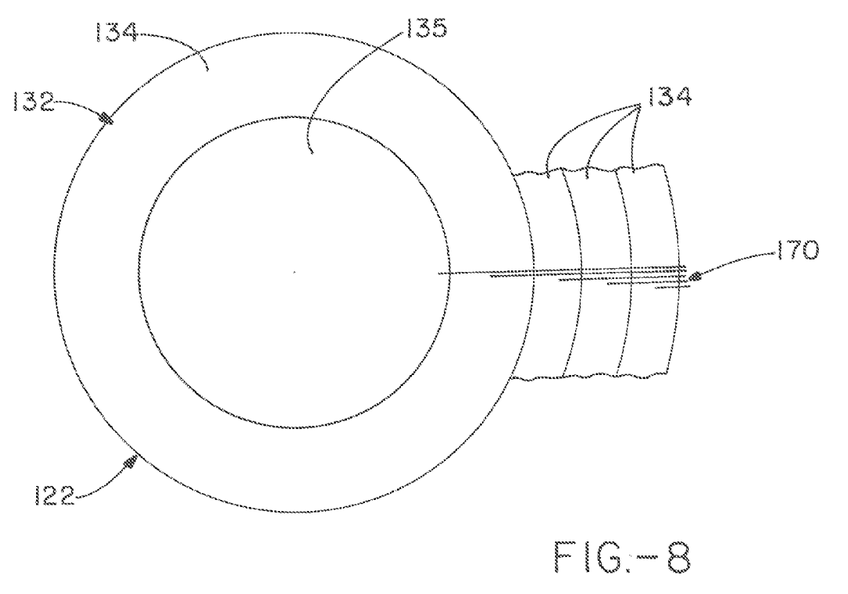
FIG. 8 is a bottom view of one embodiment of an opposing substrate containing a plurality of electrode rings thereon.

FIG. 8 illustrates one embodiment of substrate 122, adapted to be disposed on an opposing side of the liquid crystal layer 160 as compared to substrate 120 as illustrated in FIG. 10, including an electrode layer 132, in this case a counter electrode layer, including a plurality of electrode rings 134 surrounding a central ring-like circular electrode or disk electrode 135. According to the invention, a single ring or disk structure on the counter electrode layer 132 has a wider or greater area than an electrode ring of the lower substrate 120 and covers or overlaps at least one group of two or more rings. The area determination is made for electrodes dispersed directly across the liquid crystal material layer from each other, generally perpendicular or normal to the plane of the substrate where the particular electrodes are disposed. In particular, FIG. 8 illustrates the design for a coarse counter electrode layer that provides the piston-like phase change over several groups e.g. 4 fine-ring electrodes 134 of lower electrode layer 130 on substrate 120. Input connections 170 are provided for each of the electrodes of the upper electrode layer 132.

As illustrated in FIG. 10, a liquid crystal material 160 is located between substrates 120, 122 and electrode layers 130, 132.

One example of the approach of the embodiment of the invention including a tunable lens with phase wrapping is as follows.

As an example of the technique, it is assured that a device is desired that is optically tunable over a range of 1.5 diopters in 0.25 diopter steps or less. To achieve this tunable electro-optic lens, a fine-ring structure is fabricated that, in this example, has all electrodes in groups of 4 rings (i.e., electrode ring n has the same voltage has ring n+4). A counter-electrode ring structure is present on the other substrate where each electrode ring of the counter electrode ring has a much wider area and covers one group of rings of the opposing electrode, i.e. 4 fine rings, generally in a direction substantially perpendicular or normal to the plane of the substrate. FIG. 8 illustrates the design for the coarse counter-electrode layer that provides the piston-like phase change over several groups of 4 fine-ring electrodes that are illustrated in FIG. 6. The wide rings, m, are grouped into 12 rings (ring m has the same voltage as ring m+12). Thus, there are 16 input connections needed to electrically drive the lens: 12 for the wide rings of the counter-electrode and 4 for the fine rings of the first electrode. With this design, one is able to select how many groups of fine electrodes are used to get to one wave of phase retardation, realizing that the minimum number of fine rings or voltages per retardation wave for an accurate phase representation is 8. Therefore, one can select to have 2, 3, 4, 6 or 12 groups of 4 fine electrode rings per wave of phase retardation, with 12 groups per 1 wave of retardation yielding the greatest efficiency but smallest optical power, and 2 groups per wave yielding the least efficiency but greatest optical power.

For this example, the range of the required change is 1.5 diopters, so a variable lens that has a power range from −0.75 to +0.75 diopters is needed. By the choice of how the electrodes are grouped, if the highest power of the lens needs to be +0.75 diopters, then the power of the lens with 2, 3, 4, 6 or 12 groups of electrodes will be: +0.75, +0.5, +0.375, +0.25 or +0.125 diopters. Because the device works with the opposite electrical polarity, it will also generate the identical negative optical powers, as well.

Thus, this embodiment of phase-wrapped electronic lens is tunable over 11 levels of optical power. Of course, this power range can be offset by adding a fixed power lens. For example, by combining the device in the example above with a −2.25 diopter conventional lens, one can tune from −1.5 to −3.0 diopters in 11 steps. Alternatively, by combining it with a +1.75 diopter conventional lens, one can tune from +1.0 to +2.5 diopters.

To more clearly illustrate the voltages applied to the electrodes, a LC device is needed where the phase retardation is a linear function of the voltage applied, and rather than specify voltages, one can say that each electrode has a voltage that yields particular phase retardation relative to the center electrode.

With that definition, for the case of a negative lens, the voltages applied to the four fine electrodes in each group are:
Fine electrode #1=0
Fine electrode #2=$2\pi/(4*j)$
Fine electrode #3=$4\pi/(4*j)$
Fine electrode #4=$6\pi/(4*j)$
where j in this example is 2, 3, 4, 6 or 12, corresponding to the relative lens powers.

The voltages for the counter-electrodes in this example would correspond to the phases:

$$\text{Phase (radians)} = 0, \frac{2\pi}{j}, 2*\frac{2\pi}{j}, 3*\frac{2\pi}{j} \ldots (j-1)*\frac{2\pi}{j}$$

As a particular example, consider tuning this lens to be −0.5 diopters (j=3). The voltage applied to the fine electrodes will correspond to a phase of:

| | |
|---|---|
| 1. | 0 (by definition) |
| 2. | $2\pi * (1/12)$ |
| 3. | $2\pi * (2/12)$ |
| 4. | $2\pi * (3/12)$ |

The voltage applied to the counter electrodes will give a phase of:

| | |
|---|---|
| 1. | 0 (by definition) |
| 2. | $2\pi * (1/3)$ |
| 3. | $2\pi * (2/3)$ |
| 4. | 0 |
| 5. | $2\pi * (1/3)$ |
| 6. | $2\pi * (2/3)$ |
| 7. | 0 |
| 8. | $2\pi * (1/3)$ |
| 9. | $2\pi * (2/3)$ |
| 10. | 0 |
| 11. | $2\pi * (1/3)$ |
| 12. | $2\pi * (2/3)$ |

Then counting from the center electrode and going out, the relative phase at the location of each fine ring will be:

| | |
|---|---|
| 1. | 0 = 0 |
| 2. | $2\pi * (1/12) = 2\pi * (1/12)$ |
| 3. | $2\pi * (2/12) = 2\pi * (2/12)$ |
| 4. | $2\pi * (3/12) = 2\pi * (3/12)$ |
| 5. | $0 + 2\pi * (1/3) = 2\pi * (4/12)$ |
| 6. | $2\pi * (1/12) + 2\pi * (1/3) = 2\pi * (5/12)$ |
| 7. | $2\pi * (2/12) + 2\pi * (1/3) = 2\pi * (6/12)$ |
| 8. | $2\pi * (3/12) + 2\pi * (1/3) = 2\pi * (7/12)$ |
| 9. | $0 + 2\pi * (2/3) = 2\pi * (8/12)$ |
| 10. | $2\pi * (1/12) + 2\pi * (2/3) = 2\pi * (9/12)$ |
| 11. | $2\pi * (2/12) + 2\pi * (2/3) = 2\pi * (10/12)$ |
| 12. | $2\pi * (3/12) + 2\pi * (2/3) = 2\pi * (11/12)$ |
| 13. | 0 = 0 |
| 14. | $2\pi * (1/12) = 2\pi * (1/12)$ |
| 15. | $2\pi * (2/12) = 2\pi * (2/12)$ |
| 16. | $2\pi * (3/12) = 2\pi * (3/12)$ |
| 17. | .etc. |
| 18. | ... |
| 19. | ... |
| 20. | ... |

The voltages addressed to the fine electrodes and counter electrodes, corresponding to each of the optical powers as illustrated above, can be stored in a memory chip that communicates with a power supply and the lens. The chip is programmed to provide the required optical power on demand.

Tunable lens devices for example devices 10, 110 illustrated in the drawings, of the present invention can be utilized in numerous different applications, including, but not limited to, lenses, for example glasses or spectacles, cameras, various displays, telescopes, zoom lenses, wavefront correctors and equipment used to diagnose imperfections in the human eye. The tunable lenses of the invention can be utilized wherever conventional lenses and optics are utilized.

While in accordance with the patent statutes the best mode and preferred embodiment have been set forth, the scope of the invention is not limited thereto, but rather by the scope of the attached claims.

What is claimed is:

1. An electro-optic lens device comprising:
a first substantially transparent substrate comprising a first substantially transparent conductive electrode layer operatively connected thereto, the first electrode layer being patterned and comprising a first plurality of ring electrodes that form a first resistive divider network, wherein at least one ring electrode from the first plurality of ring electrodes is electrically connected to an adjacent ring electrode from the first plurality of ring electrodes by a first resistive bridge that electrically bridges a substantially annular insulating gap that is substantially co-planar with the first resistive bridge, the first resistive bridge comprising a resistive path across the insulating gap, the resistive path comprising an electrically conductive material bordered by a non-conductive material or an area free from conductive material, each ring electrode from the first plurality of ring electrodes defining a corresponding continuous ring;

a second substantially transparent substrate comprising a second substantially transparent conductive electrode layer operatively connected thereto; and an electroactive liquid crystal material layer present between the first substantially transparent substrate and the second substantially transparent substrate;

wherein:

a first sub-plurality of continuous ring electrodes from the first plurality of continuous ring electrodes is connected to a first input connection, the first input connection terminating an input line, the input line extending through a first via that penetrates a first insulating layer that substantially separates the first electrode layer from the input line.

2. The electro-optic lens device of claim 1, wherein:
the electro-optic lens device is tunable from a first optical power to a second optical power when a first voltage is applied to the first input connection.

3. The electro-optic lens device of claim 1, wherein:
the second electrode layer is patterned and comprises a second plurality of ring electrodes that form a second resistive divider network.

4. The electro-optic lens device of claim 1, wherein:
the second electrode layer is patterned and comprises a second plurality of ring electrodes that form a second resistive divider network, wherein at least one ring electrode from the second plurality of ring electrodes is electrically connected to an adjacent ring electrode by a second resistive bridge.

5. The electro-optic lens device of claim 1, wherein:
a second sub-plurality of ring electrodes from the first plurality of ring electrodes is connected to a second input connection through a second via that penetrates the first insulating layer.

6. The electro-optic lens device of claim 1, wherein:
the first electrode layer comprises a plurality of sets of ring electrodes, each set comprising a corresponding plurality of ring electrodes.

7. The electro-optic lens device of claim 1, wherein:
the first electrode layer comprises a plurality of sets of ring electrodes, each set comprising a corresponding plurality of ring electrodes, a dedicated input connection is provided for each set, and wherein a dedicated resistive bridge is provided between each adjacent pair of ring electrodes in each set.

8. The electro-optic lens device of claim 1, wherein:
at least one ring electrode on the second substantially transparent substrate completely covers in a planar direction at least two co-planar ring electrodes of the first substantially transparent substrate.

9. The electro-optic lens device of claim 1, wherein:
adjacent ring electrodes of the same electrode layer of one or more of the first substantially transparent conductive electrode layer and the second substantially transparent conductive electrode layer are disposed in different planes.

* * * * *